(12) United States Patent
Golchha et al.

(10) Patent No.: US 11,977,952 B1
(45) Date of Patent: May 7, 2024

(54) APPARATUS AND A METHOD FOR GENERATING A CONFIDENCE SCORE ASSOCIATED WITH A SCANNED LABEL

(71) Applicant: Pramana Inc., Cambridge, MA (US)

(72) Inventors: Priyanka Golchha, Rajasthan (IN);
Manish Shiralkar, Pune (IN);
Prasanth Perugupalli, Cary, NC (US);
Pavani Pallavi Pelluru, Pocharam (IN);
Raghubansh Bahadur Gupta, Bangalore (IN); Jaya Jain, Bhopal (IN)

( * ) Notice: Subject to any disclaimer, the term of this patent is extended or adjusted under 35 U.S.C. 154(b) by 0 days.

(21) Appl. No.: 18/226,017

(22) Filed: Jul. 25, 2023

(51) Int. Cl.
*G06K 7/14* (2006.01)
(52) U.S. Cl.
CPC ......... *G06K 7/1417* (2013.01); *G06K 7/1413* (2013.01)
(58) Field of Classification Search
CPC ............................ G06K 7/1417; G06K 7/1413
See application file for complete search history.

(56) References Cited

U.S. PATENT DOCUMENTS

| | | | |
|---|---|---|---|
| 9,014,480 B2 | 4/2015 | Baheti | |
| 9,342,741 B2 | 5/2016 | Amtrup | |
| 11,430,202 B2 | 8/2022 | Whitestone | |

OTHER PUBLICATIONS

I. Alzuru, A. Matsunaga, M. Tsugawa and J. A. B. Fortes, "General Self-aware Information Extraction from Labels of Biological Collections," 2020 IEEE International Conference on Big Data (Big Data), Atlanta, GA, USA, 2020, pp. 3035-3044, doi: 10.1109/BigData50022.2020.9377737. (Year: 2020).*

* cited by examiner

*Primary Examiner* — Matthew Mikels
(74) *Attorney, Agent, or Firm* — Caldwell Intellectual Property Law

(57) ABSTRACT

An apparatus for generating a confidence score associated with a scanned label is disclosed. The apparatus includes at least a processor and a memory communicatively connected to the at least a processor. The memory instructs the processor to receive a profile comprising at least a label containing a plurality of metadata associated with the at least a label. The memory instructs the processor to generate a scanned label as a function of the at least a label, wherein generating a scanned label comprises scanning the at least a label using a text recognition module. The memory instructs the processor to determine a confidence score associated with the at least a label as a function of a comparison between the scanned label and a plurality of historical scanned labels. The memory instructs the processor to display the confidence score using a display device.

18 Claims, 8 Drawing Sheets

APPARATUS AND A METHOD FOR GENERATING A CONFIDENCE SCORE ASSOCIATED WITH A SCANNED LABEL

FIELD OF THE INVENTION

The present invention generally relates to the field of data analysis. In particular, the present invention is directed to an apparatus and a method for generating a confidence score associated with a scanned label.

BACKGROUND

In various fields, such as healthcare, pathology, logistics, and document management, the need for accurate and reliable extraction of information from scanned labels is crucial. However, OCR technology, which converts text within images or documents into machine-readable format, is not always perfect and can introduce errors due to factors like image quality, font variations, or handwriting inconsistencies.

SUMMARY OF THE DISCLOSURE

In an aspect, an apparatus for generating a confidence score associated with a scanned label is disclosed. The apparatus includes at least a processor and a memory communicatively connected to the at least a processor. The memory instructs the processor to receive a profile comprising at least a label containing a plurality of metadata associated with the at least a label. The memory instructs the processor to generate a scanned label as a function of the at least a label, wherein generating a scanned label comprises scanning the at least a label using a text recognition module. The memory instructs the processor to determine a confidence score associated with the scanned label as a function of a comparison between the scanned label and a plurality of historical scanned labels. The memory instructs the processor to display the confidence score using a display device.

In another aspect, a method for generating a confidence score associated with a scanned label is disclosed. The method includes receiving, using at least a processor, a profile comprising at least a label containing a plurality of metadata associated with the at least a label. The method includes generating, using the at least a processor, a scanned label as a function of the at least a label, wherein generating a scanned label comprises scanning the at least a label using a text recognition module. The method includes determining, using the at least a processor, a confidence score associated with the scanned label as a function of a comparison between the scanned label and a plurality of historical scanned labels. The method includes displaying the confidence score using a display device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for generating a confidence score associated with a scanned label is disclosed. The apparatus includes at least a processor and a memory communicatively connected to the at least a processor. The memory instructs the processor to receive a profile comprising at least a label containing a plurality of metadata. The memory instructs the processor to generate a scanned label as a function of the at least a label, wherein generating a scanned label comprises scanning the at least a label using a text recognition module. The memory instructs the processor to determine a confidence score as a function of a comparison between the scanned label and a plurality of historical scanned labels. The memory instructs the processor to display the confidence score using a display device. Exemplary embodiments illustrating aspects of the present disclosure are described below in the context of several specific examples.

Figure 1:
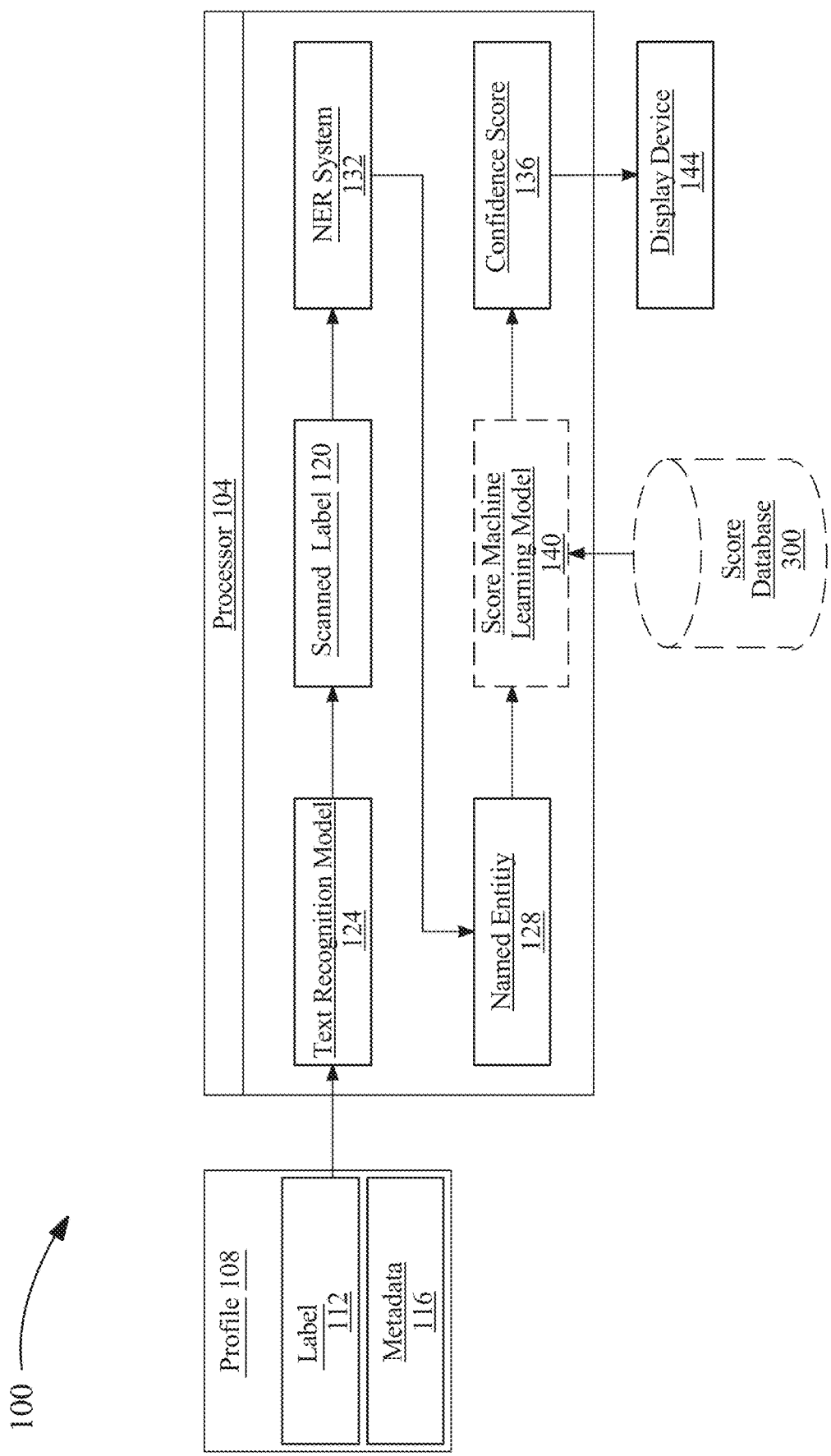
FIG. 1 is a block diagram of an exemplary embodiment of an apparatus for generating a confidence score associated with a scanned label.

Referring now to FIG. 1, an exemplary embodiment of an apparatus 100 for generating a confidence score associated with a scanned label is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may be configured to receive a profile 108 from a user. For the purposes of this disclosure, a "profile" is a representation of information and/or data describing information an individual or a group slides. A profile 108 may be made up of a plurality of slide data. As used in the current disclosure, "data" is information associated with slide. The profile 108 may be a digital representation of a histology slide. As used in the current disclosure, a "histology slide" is a slide containing a portion of biopsied tissue. A histology slide may include biopsied tissue from a patient, wherein the biopsied tissue is sliced into very thin layers and placed on a glass slide. A digital representation of the histology slide may include digital photos of the histology slide. These photos may include digital photos taken under a microscope. A profile 108 may additionally include paperwork surrounding the histology slide. Current disclosure may include information regarding testing, analysis, storage, and disposal of histology slides by medical professionals. A profile 108 may be created by a processor 104, a user, medical professional, or a third party (e.g. Spouse, Support Staff, Family Member, and the like). The profile 108 may include any of the following personal information: age, weight, height, gender, geographical location, diagnostic information, medical history, test result, lab result, and the like. A profile 108 may include information medical information associated with patient and/or tissue.

With continued reference to FIG. 1, a profile 108 contains a label 112 associated with the histology slide. As used in the current disclosure, a "label" is a descriptive tag or identifier that is assigned to an individual or a group histology slides. A label 112 may contain a plurality of information regarding the histology slide. A label 112 may contain information regarding a patient or caser identifier, wherein a unique identifier is assigned to a specific patient or case, which helps in tracking and referencing slides related to that case. A label 112 may contain information regarding the type of biological sample, disease, tissue, morphology, and the like contained within the histology slide. This may include they type of tissue or sample that the slide represents, such as breast tissue, lung biopsy, skin lesion, cardiac tissue, liver tissue, and the like. In some cases, a label 112 may contain information regarding a pathological diagnosis or condition being investigated or identified on the slide, such as carcinoma, lymphoma, or infectious disease. Labels 112 may contain information regarding the specific staining or analysis techniques that have been applied to the histology slide. The specific staining or preparation technique used on the slide, which can provide additional information about the slide's characteristics, including but not limited to techniques such as hematoxylin and eosin (H&E) staining, immunohistochemistry (IHC), or special stains. Labels 112 may include additional notes, observations, or annotations made by the pathologist that may be relevant to the slide, such as the presence of specific features or abnormalities. Labels 112 may additionally include grading labels, staging labels, quality assessment labels, and the like. A grading label may reflect the severity or stage of the disease based on certain criteria. A quality assessment label may reflect the reliability or suitability of the slide for analysis. The specific use of labels may vary depending on the pathology laboratory's protocols and practices. The purpose of labels is to enhance the organization, communication, and retrieval of histology slides within a laboratory or medical facility.

With continued reference to FIG. 1, a label 112 may come in a plurality formats. The labels 112 may include both printed labels, digital labels, handwritten labels, photographs of labels, scans of labels, and the like. In some cases, a label may take the form of an identification code. As used in the current disclosure, an "identification code" is a visual representation of the label. An identification code may include a barcode. A barcode may consist of a series of parallel lines, bars, or squares of varying widths and spacings. The barcode may serve as a unique identifier for the slide and contains encoded data that provides relevant information about the slide. Identification codes are designed to be scanned or read by barcode scanners or readers, which can quickly decode the encoded information. Identification codes are widely used in various industries for purposes such as product identification, inventory management, and tracking. Identification codes may include both one-dimensional (1D) barcodes and two-dimensional (2D) barcodes. A linear or one-dimensional (1D) barcode, which is composed of a sequence of vertical bars and spaces. The width and spacing of these bars and spaces represent specific patterns that encode alphanumeric or numeric data. Examples of 1D barcodes include the Universal Product Code (UPC) and the Code 39 barcode. A two-dimensional (2D) barcode, which can encode more complex information in a smaller space. 2D barcodes use patterns of squares, dots, or other geometric shapes to represent data. Examples of 2D barcodes include the QR code (Quick Response code) and the Data Matrix code. By scanning the barcode associated with the histology slide, healthcare professionals can quickly access the associated information in a digital database or Laboratory Information System (LIS). This facilitates efficient tracking, identification, and retrieval of slides during diagnostic processes, consultations, or research.

With continued reference to FIG. 1, a profile 108 includes a plurality of metadata 116. As used in the current disclosure, "metadata" refers to descriptive information or attributes that provide context, structure, and meaning to data. Metadata 116 is essentially data about data. Metadata 116 helps in understanding and managing various aspects of data, such as its origin, content, format, quality, and usage. It plays a crucial role in organizing, searching, and interpreting data effectively. Metadata 116 may include descriptive metadata, structural metadata, administrative metadata, technical metadata, provenance metadata, usage metadata, and the like. Metadata 116 may be organized and managed through metadata schemas, standards, or frameworks. These provide guidelines and specifications for capturing, storing, and exchanging metadata in a consistent and structured manner. Common metadata 116 standards include Dublin Core, Metadata Object Description Schema (MODS), and the Federal Geographic Data Committee (FGDC) metadata standard. In some cases, metadata 116 may be associated with a label 112 for a histology slide. Metadata 116 may provide additional descriptive information or attributes that are linked to the slide's label. This metadata 116 provides context and relevant details about the slide, aiding in its identification, categorization, and management within a pathology laboratory or medical facility. The specific metadata 116 associated with a label 112 can vary based on the requirements and practices of the medical facility. Metadata 116 associated with the label may include patient information. Patient information may include data such as the patient's name, unique patient identifier (ID), age, gender, and any other relevant demographic information. Patient information helps in identifying and associating the slide with the correct individual's medical records. Metadata 116 may also include case specific details, wherein case specific details may include information about the specific case or clinical scenario related to the slide. Case specific details may include information about the case number, referring physician, clinical history, relevant symptoms, or any other pertinent details that aid in understanding the context of the slide. In some cases, metadata 116 may include information related to the specific specimen type of the slide. This may include the type of tissue or sample that the slide represents. Metadata 116 may contain notes, comments, or observations made by the pathologist or other medical professional. These annotations might highlight specific features, anomalies, or noteworthy aspects of the slide that are important for interpretation or follow-up analysis. For instance a timestamp reflecting when and where the slide was prepared, analyzed, or labeled can be associated as metadata 116. This information helps in tracking and maintaining a chronological record of slide-related activities. It could be breast tissue, lung biopsy, skin lesion, or any other anatomical or pathological specimen. In some embodiments, metadata may contain information regarding staining or preparation technique, pathological diagnosis, and the like.

With continued reference to FIG. 1, processor 104 is configured to generate a scanned label 120 as a function of the at least a label 112. As used in the current disclosure, a "scanned label" is a label 112 that has been converted from a physical document or an image to machine encoded text or binary code. A scanned label 120 may refer to the process of capturing or digitizing the information on a label using a scanning device, such as a barcode scanner or an optical character recognition (OCR) system. Scanning the label 112 allows for the automatic extraction and interpretation of the label's content for further processing or integration into a digital system. When a label 112 is scanned, the scanning device captures the visual representation of the label, whether it is a barcode, text, or a combination of both. Processor 104 then then converts the scanned image into a scanned label 120 that can be read and interpreted by a computer or software system. This include converting the image associated with the label 112 into machine encoded text. In a non-limiting example, if the label 112 scanned using a barcode scanner, assuming the label 112 is a barcode. The scanner converts the barcode into a scanned label 120 which includes binary code that represents the encoded data. In another non-limiting example, if the label 112 contains text or alphanumeric characters, an OCR system scans the label and uses image recognition algorithms to identify and convert the characters into a scanned label 120 that includes machine encoded text. The OCR software analyzes the scanned image, identifies the shapes and patterns of the characters, and applies character recognition techniques to convert them into digital text. In some embodiments, once the scanned label 120 is generated textual data may be extracted from the label. Textual data may be associated with the corresponding histology slide in a digital database or Laboratory Information System (LIS). This enables efficient tracking, retrieval, and management of histology slides, as data from the scanned label 120 can be used for various purposes such as patient identification, case management, and slide categorization.

With continued reference to FIG. 1, processor 104 is configured to generate a scanned label 120 using a text recognition module 124. As used in the current disclosure, a "text recognition module" is a software designed to automatically recognize and extract text from images or scanned document. It is a technology that enables computers to understand and interpret printed or handwritten text characters. The output of a text recognition module 124 may be the extracted text in a machine-readable format, which can be further processed, stored, or analyzed by other applications or systems. The accuracy and performance of a text recognition module 124 may depend on factors such as the quality of the input image, the complexity of the text, the language being recognized, and the robustness of the recognition algorithms. In some embodiments, text recognition modules 124 may find application in various fields, including document digitization, data entry, automated form processing, intelligent character recognition (ICR), and automated reading of printed or handwritten text in areas such as optical mark recognition (OMR), invoice processing, and text-based searching within images or scanned documents.

Still referring to FIG. 1, a text recognition module 124 may include an optical character recognition (OCR) system. An optical character recognition system or optical character reader (OCR) may be configured to convert of images of written text (e.g., typed, handwritten, or printed) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases. a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 2. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor may be configured to transform data extracted from a label 112 into a digital format, wherein the digital format may be stored and manipulated electronically by the processor 104. Examples of a digital format may include a textural representation (e.g., plain text, XML, JSON, and the like) or/and a graphical representation (scanned labels that contain graphical elements, such as hand-drawn annotations or symbols, may require this representation, e.g., digital vector graphics or bitmap images). Additionally, or alternatively, digital representation may be further structured using specific data formats, for example, and without limitation, scanned label may be represented using standard formats like DICOM (Digital Imaging and Communications in Medicine) or HL7 (Health Level 7) to ensure interoperability with existing healthcare systems (list some examples here if any), enabling seamless integration with databases 300 and facilitating efficient data exchange and interoperability.

With continued reference to FIG. 1, processor 104 may be configured to generate a plurality of named entities 128 as a function of the scanned label 120 using a named entity recognition process. As used in the current disclosure, a "named entity" is a specific type of word or phrase that represents a real-world object with a unique identity. Named entities are typically people, places, ideas, concepts, or things that denote specific individuals, organizations, locations, dates, times, products, events, quantities, diseases, tissue samples, and other entities that can be uniquely identified. These entities play a significant role in understanding the context and extracting meaningful information from text. Named entities may provide contextual information and serve as reference points for understanding the meaning and relationships within a text. Recognizing and extracting named entities from textual data is a fundamental task in natural language processing (NLP), information extraction, text mining, and various other applications where understanding the semantics and identifying key elements of text is important.

With continued reference to FIG. 1, processor 104 may be configured to generate a plurality of named entities 128 using a named entity recognition (NER) system 132. As used in the current disclosure, a "named entity recognition (NER) system" is software that identifies a plurality of named entities 128 in from text. A NER system 132 may be configured to identify a plurality of named entities from a scanned label 120. Inputs of a NER system 132 may include a profile 108, label 112, scanned label 120, metadata, and the like. The output of a named entity recognition system 132 may include a plurality of named entities 128. Named entities 128 may include a structured representation of the identified named entities, typically in the form of annotations or tags attached to the original text.

With continued reference to FIG. 1, a NER system 132 may generate a plurality of named entities 128 using a natural language processing model. As used in the current disclosure, a "natural language processing (NLP) model" is a computational model designed to process and understand human language. It leverages techniques from machine learning, linguistics, and computer science to enable computers to comprehend, interpret, and generate natural language text. The NLP model may preprocess the input text, wherein the input text may include the label 112 and the scanned label 120, or any other data mentioned herein. Preprocessing the input text may involve tasks like tokenization (splitting text into individual words or sub-word units), normalizing the text (lowercasing, removing punctuation, etc.), and encoding the text into a numerical representation suitable for the model. The NLP model may include transformer architecture, wherein the transformers are deep learning models that employ attention mechanisms to capture the relationships between words or sub-word units in a text sequence. They consist of multiple layers of self-attention and feed-forward neural networks. The NLP model may weigh the importance of different words or sub-word units within a text sequence while considering the context. It enables the model to capture dependencies and relationships between words, taking into account both local and global contexts. This process may be used to identify a plurality of named entities 128. Language processing model may include a program automatically generated by processor 104 and/or named entity recognition system to produce associations between one or more significant terms extracted from a scanned label 120 and detect associations, including without limitation mathematical associations, between such significant terms. Associations between language elements, where language elements include for purposes herein extracted significant terms, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted significant term indicates a given category of semantic meaning. As a further example, statistical correlations and/or mathematical associations may include probabilistic formulas or relationships indicating a positive and/or negative association between at least an extracted significant term and/or a given semantic relationship; positive or negative indication may include an indication that a given document is or is not indicating a category semantic relationship. Whether a phrase, sentence, word, or other textual element in scanned label 120 constitutes a positive or negative indicator may be determined, in an embodiment, by mathematical associations between detected significant terms, comparisons to phrases and/or words indicating positive and/or negative indicators that are stored in memory at processor 104, or the like.

With continued reference to FIG. 1, processor 104 may classify a plurality of named entities 128 into a plurality of entity categories. As used in the current disclosure, "entity categories" is a category that is representative of one or more predefined classes or types of data. Entity categories may be related to one or more aspects of the histology slide. Entity categories may include broad areas or aspects of a histology slide. Non-limiting examples of entity categories may include patient name, patient identification code, slide identification code, specimen identification code, specimen type, stains or preparation techniques, alphanumeric identification codes, pathological diagnosis, scoring or ranking of the histology slide, annotations, observations, notes, medical facility name, medical facility identification number, and the like. In an embodiment, a processor 104 may be configured to generate a plurality of entity categories based on the available the scanned label 120. Processor 104 may generate a plurality of entity categories based on historical versions of the entity categories. Processor 104 may generate a plurality of entity categories by extracting relevant features, characteristics, or traits associated with the scanned label 120. Identification of features may depend on the nature and type of histology slide. In a non-limiting example, plurality of named entities 128 may be classified into a plurality of entity categories based on their semantic meaning. In other embodiments, a processor 104 be configured to receive a plurality of entity categories from a database such as database 300. In an embodiment, entity categories may be used to retrieve regular expression associated with each named entity from the database.

With continued reference to FIG. 1, processor 104 may be configured to classify each named entity into the plurality of entity categories based on the named entities 128 spatial position on the scanned label 120. As used in the current disclosure, "spatial position" refers to the positing of the named entity on the label 112. Spatial positioning may be a form of template base NER. Template-based Named Entity Recognition (NER) is an approach to identifying named entities in text using predefined templates or patterns. It relies on a set of fixed patterns that represent the structure or characteristics of the named entities you want to extract. In the current case, the template may include a plurality of fields in fixed spatial positions so that processor 104 is able assign the content of each of those fields to an entity category. The spatial position on the label 112 may be associated with one or more entity categories. The fields on a label 112 may contain important information related to the slide and its associated data. These fields may provide identification, categorization, and contextual details about the slide. The specific fields on a label 112 may be configured to have the same spatial positioning. In a non-limiting example, a label 112 may include a spatial position or a field for a person's name. To capture person names, processor 104 may consult the lookup table, mentioned herein below, to retrieve a list of know person names, populating the persons name in the spatial position for a persons name. can vary depending on the laboratory or institution. Each field on a label 112 may be associated with an entity category. Thus, processor 104 may be configured to classify each named entity 128 into entity categories based on the spatial position on a label 112. Processor 104 may be configured to identify spatial positions on the scanned label as a function of the medical facility that the scanned label 120 is associated with. Processor 104 the medical facility may be identified using an alphanumeric code or another identifier on the label 112 or within its associated metadata 116.

With continued reference to FIG. 1, a processor 104 may determine a plurality of named entities using a lookup table. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in static program storage, calculated as part of a program's initialization phase or even stored in hardware in application-specific platforms. Data within the lookup table may include previous examples of named entities compared to the scanned label 120. Data within the lookup table may be received from database 300. Lookup tables may also be used to generate a plurality of named entities 128 by matching an input value to an output value by matching the input against a list of valid (or invalid) items in an array. In a non-limiting example, a scanned label 120 include a plurality of fields containing text that describes various aspects of the slide. Examples of named entities may indicate that a list of named entities from this particular medical facility includes a patient name, patient identification number, sample identification number, and a listing of the staining or preparation techniques used on the slide. A lookup table may look up the scanned label 120 as an input and output a list of named entities 128. Processor 104 may be configured to "lookup" or input one or more scanned label 120, label 112, profile 108, metadata 116, examples of named labels, and the like. Whereas the output of the lookup table may include a list of named entities. Alternatively or additionally, a query representing elements of scanned label 120 may be submitted to the lookup table and/or a database, and an associated data fault identifier stored in a data record within the lookup table and/or database may be retrieved using the query.

With continued reference to FIG. 1, processor 104 may be configured to generate a scanned label 120 using a label machine-learning model. As used in the current disclosure, a "label machine-learning model" is a machine-learning model that is configured to generate a scanned label. The label machine-learning model may be consistent with the machine-learning model or a classifier as described below in FIG. 2. Inputs to the label machine-learning model may include profile 108, label 112, metadata 116, a plurality of entity categories, examples of scanned labels 120, examples of named entities 128, and the like. Outputs to the label machine-learning model may include a scanned label 120 and a listing of named entities. In some embodiments, a label machine learning model may be configured to sort a listing of named entities 128 into one or more entity categories. Label training data is a plurality of data entries containing a plurality of inputs that are correlated to a plurality of outputs for training a processor by a machine-learning process. In an embodiment, label training data may comprise a plurality of labels 112 correlated to examples of scanned labels 120. In another embodiment, label training data may comprise a plurality of labels 112 correlated to examples of named entities. Label training data may be received from database

300. Label training data may contain information regarding profile 108, label 112, metadata 116, a plurality of entity categories, examples of scanned labels 120, examples of named entities 128, and the like. Machine-learning models may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning models, learning vector quantization, and/or neural network-based machine-learning models.

With continued reference to FIG. 1, processor 104 determines a confidence score 136 as a function of a comparison between the scanned label 120 and a plurality of previously scanned labels 120. As used in the current disclosure, a "confidence score" is quantitative measurement of the accuracy of the content generated from scanned label 120. Accuracy of the content of the scanned label 120 may refer to an accurate translation of the text of the label 112 when generating the scanned label 120. Accuracy of the content of the scanned label 120 may also refer to the likelihood that text of the scanned label 120 accurately reflects the content of the histology slide. A processor 104 may generate A confidence score 136 for each attribute of each entity. A confidence score 136 may be used to normalize one or more scanned labels 120 to bring all scanned labels 120 onto a comparable scale. This step is important to eliminate any bias introduced by different qualities or views of the scanned labels. Normalization techniques can include min-max scaling, z-score normalization, or logarithmic transformation. In an embodiment, if content that is generated from the scanned label 120 is accurate then the confidence score 136 may be high, conversely if content that is generated from the scanned label 120 is likely inaccurate then the confidence score 136 may be low. A confidence score 136 may be expressed as a numerical score, a linguistic value, alphanumeric score, or an alphabetical score. Confidence score 136 may be represented as a score used to reflect the level of accuracy of the content of the scanned label 120. A non-limiting example, of a numerical score, may include a scale from 1-10, 1-100, 1-1000, and the like, wherein a rating of 1 may represent an inaccurate scanned label 120, whereas a rating of 10 may represent an accurate scanned label 120. In another non-limiting example, linguistic values may include, "Highly Accurate," "Moderately Accurate," "Moderately Inaccurate," "Highly Inaccurate," and the like. In some embodiments, linguistic values may correspond to a numerical score range. For example, a scanned label 120 that receives a score between 50-75, on a scale from 1-100, may be considered "Moderately Accurate."

With continued reference to FIG. 1, a confidence score 136 may be generated by comparing the current scanned label 120 to historically scanned labels. As used in the current disclosure, "historically scanned labels" are scanned labels 120 that have been generated prior to the current iteration of scanned labels 120. Processor 104 may identify a plurality of historically scanned labels as a function of the metadata 116 associated with the label 112. The metadata 116 may contain information regarding patient identifiers or medical facility identifiers. Based on the patient identifiers and/or medical facility identifiers processor 104 may generate a plurality of historically scanned labels from the same facility and/or patient of the current scanned label 120. Processor 104 may compare the historically scanned labels the current scanned label 120 may be comparing their content, spatial position, font, and the like. To compare a scanned label 120 to historically scanned labels to verify the accuracy of the scanned label 120, a processor 104 may implement a process that involves data matching and comparison. Processor 104 may extract relevant features or attributes are extracted from the current scanned label 120 and the historically scanned labels. These features could include specific fields or data elements such as slide IDs, patient IDs, specimen types, dates of collection, or any other relevant information present on the label. Processor 104 may then apply a comparison algorithm to evaluate the similarity or differences between the extracted features of the current scanned label 120 and the historically scanned labels. The choice of the comparison algorithm depends on the specific requirements and nature of the data. For example, it could be a simple string comparison, machine learning model, fuzzy matching algorithm, or more advanced techniques like Levenshtein distance or token-based similarity measures. Processor 104 may determine if there is a match or similarity threshold that indicates the accuracy of the current scanned label. If a match is found, it can be considered as a verification of the accuracy of the label. If there are discrepancies or differences, it may require further investigation or manual verification. Processor 104 may assign a confidence score 136 to indicate the level of accuracy or similarity between the current scanned label 120 and the historically scanned labels. This score can be based on the results of the comparison algorithm and can be used to make decisions or trigger appropriate actions based on predefined thresholds. In an embodiment a historically scanned label may be a barcode as mentioned herein above.

With continued reference to FIG. 1, a confidence score 136 may include a derivation score. As used in the current disclosure, a "derivation score" is a score that addresses variations in scanned label 120 as compared to historical scanned labels. These variations may be caused due to errors in the OCR system performance due to text attributes like font, boldness, italics, handwriting, etc. If the OCR system does not provide the same result for several OCR scans associated with the same user, the derivation score may be affected negatively. Processor 104 may be configured to preprocess the scanned label 120. Preprocessing may include steps to normalize the text attributes within the scanned label 120. This could involve standardizing the font, removing unnecessary formatting, or converting the text to a consistent style (e.g., removing italics or boldness). Processor 104 may then extract relevant features or attributes are extracted from the scanned label and the previously scanned labels. These features could include the text content, font type, font size, boldness, italics, or any other relevant attributes that may impact OCR performance. Processor 104 may then compare the OCR results of the scanned label 120 with the OCR results of the historically scanned labels. It assesses the variations or differences in the OCR output, taking into account text attributes like font, boldness, italics, or handwriting styles. Based on the comparison results, a derivation score may be calculated to quantify the level of variation or inconsistency in the OCR performance. This score takes into account the frequency and magnitude of variations in the OCR output associated with different text attributes. The derivation score may serve as an indicator of the OCR system's performance consistency. A lower derivation score suggests a lower likelihood of variations in OCR results due to text attributes, which may decrease confidence in the accuracy of the detection. Conversely, a higher derivation score indicates more consistent OCR performance across different scans of the same user, increasing confidence in the detection.

With continued reference to FIG. 1, a confidence score 136 may include an expression score. As used in the current disclosure, an "expression score" is a score that represents OCR system's translation of one or more words within scanned label. An expression score may be reflected for each word in the scanned label 120 or it may be aggregated to provide one score for all of the words included in the scanned label 120. Processor 104 may be configured to preprocess the scanned label 120. Preprocessing may include steps to normalize the text attributes within the scanned label 120. This could involve standardizing the font, removing unnecessary formatting, or converting the text to a consistent style (e.g., removing italics or boldness). Processor 104 may then extract a plurality of words from the scanned label 120. In some embodiments, an expression score may include a classification of each word of the scanned label 120 to a named entity 128. This classification can be performed by mapping the expression scores to a predefined set of named entities or categories. For each extracted word, processor 104 calculates an expression score that reflects the match or alignment with the expected named entity category. This score takes into account the presence or absence of the named entity's associated with the extracted word. The expression scores may serve as a confidence metric for the accuracy of the named entity classification. If the text extracted by OCR does not match the a named entity 128 of the plurality of named entities 128, then the confidence goes down. A higher expression score indicates a better alignment with the expected named entity, while a lower score suggests a potential error or mismatch.

With continued reference to FIG. 1, a confidence score 136 may include a consistency score. As used in the current disclosure, a "consistency score" is a score that represents confidence in a barcode. As mentioned herein above, a scanned label 120 may include one or more barcodes. The scanned label 120 (barcode) obtained through the OCR process may undergo preprocessing steps to normalize and clean the data. This could involve removing noise, correcting errors, or formatting the text. Processor 104 applies barcode recognition techniques to extract the barcode information from the scanned label 120. This process can involve decoding the barcode using specific algorithms or libraries designed for barcode recognition. Processor 104 then extracts any accompanying text or information present along with the barcode using the text recognition system, mentioned herein above. Processor 104 may compare the content described by the extracted barcode with the historically scanned label or the OCR scan. It evaluates if there is a difference or mismatch between the information derived from the barcode and historically scanned labels. Based on the content comparison, the processor 104 may generate a consistency score that reflects the level of consistency between the barcode and the historically scanned label or other OCR generated text. If there is a difference in the content described by the barcode and the OCR scan, the confidence goes down, resulting in a lower consistency score. The generated Consistency score provides a measure of the accuracy between the scanned label 120 (barcode) and historically scanned label or/and the text obtained through OCR recognition. It helps assess the reliability and confidence in the accuracy of the scanned label. By evaluating the consistency score, the computer can make informed decisions, trigger appropriate actions, or initiate further verification steps based on predefined confidence thresholds.

With continued reference to FIG. 1, a confidence score 136 may include a temporal consistency score. As used in the current disclosure, a "temporal consistency score" is a score that addresses errors incurred due to limitations inconsistencies in handwriting or printed text. A temporal consistency score may be generated by comparing the current OCR scan to other documents associated with the same user to catch the degradation and help lower confidence. For example, if a handwritten document contains the letter "R" but the OCR system interprets the letter as "K" due to unclear handwriting. Processor 104 may compare the handwritten document to other documents in the set to identify a discrepancy between the scanned label 120 and historically scanned labels. The temporal consistency score may reflect the confidence processor 104 has in the scanned label. In the above mentioned example, the temporal consistency score may be negatively effected due to the misinterpretation of the letter "R." Processor 104 may place the scanned label 120 through preprocessing steps to normalize and clean the data. This includes removing noise, correcting errors, and formatting the text for comparison. Processor 104 then compares the current scanned label 120 to historically scanned labels. This comparison aims to identify any inconsistencies or discrepancies in the text due to limitations in handwriting or printed text quality. Based on the text comparison, the processor 104 may calculate a temporal consistency score that reflects the level of consistency or inconsistency between the current scanned label 120 and the historically scanned labels. This score helps assess the temporal consistency and potential degradation of text recognition accuracy.

With continued reference to FIG. 1, Processor 104 may generate a confidence score 136 as a function of the temporal consistency score, consistency score, expression score, and a derivation score. This embodiment of a confidence score 136 may be an overall reflection of the confidence the content generated from scanned label 120. In an embodiment, a confidence score 136 may be generated by averaging two or more of the above mentioned scores. This may include assigning each score a weighted average. In another embodiment, a confidence score 136 may be generated by evaluating the highest or lowest score among the four as the confidence score 136.

With continued reference to FIG. 1, processor 104 may generate the confidence score 136 using a score machine-learning model 140. As used in the current disclosure, an "score machine-learning model" is a machine-learning model that is configured to generate a confidence score 136. The score machine-learning model 140 may be consistent with the machine-learning model described below in FIG. 2. Inputs to the score machine-learning model 140 may include profile 108, label 112, metadata 116, a plurality of entity categories, scanned labels 120, named entities 128, examples of confidence scores 136, and the like. Outputs to the score machine-learning model 140 may include a confidence score 136 tailored to one or more scanned labels 120. Outputs to the score machine learning model may additionally include a variation score, expression score, consistency score, and temporal consistency score. Score training data may include a plurality of data entries containing a plurality of inputs that are correlated to a plurality of outputs for training a processor by a machine-learning process. In an embodiment, score training data may include a plurality of scanned labels 120 correlated to examples of confidence scores 136. Examples of confidence scores 136 may include historical confidence scores 136 that have been generated from previous iterations of score machine learning model or apparatus 100. Score training data may be received from database 300. Score training data may contain information regarding profile 108, label 112, metadata 116, a plurality of entity categories, scanned labels 120, named entities 128, examples of confidence scores 136, and the like. In an embodiment, a score machine-learning model 140 may be iteratively updated with the input and output results of past score machine-learning models. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, processor 104 may generate the confidence score 136 as a function of a comparison between the scanned label 120 and the historically scanned labels using a comparison fuzzy inference. As used in the current disclosure, a "comparison fuzzy inference" is a method that interprets the values in the input vector (i.e., scanned label 120 and historically scanned labels) and, based on a set of rules, assigns values to the output vector. A set of fuzzy rules may include a collection of linguistic variables that describe how the system should make a decision regarding classifying an input or controlling an output. Fuzzy inference rules operate on fuzzy sets and provide a framework for mapping input variables to output variables through linguistic rules. Fuzzy inference rules may operate using linguistic variables, which represent imprecise or vague concepts rather than precise numerical values. Linguistic variables are defined by membership functions, which describe the degree of membership or truth for different linguistic terms or categories. In a non-limiting example, a linguistic variable associated with the confidence score 136 may have linguistic terms like "High Confidence," "Moderate Confidence," and/or "Low Confidence," each with its corresponding membership function. A fuzzy inference rule typically follows a conditional "IF-THEN" structure. It consists of an antecedent (IF part) and a consequent (THEN part). The antecedent specifies the conditions or criteria based on which the rule will be applied, and the consequent determines the output or conclusion of the rule. In an embodiment. the confidence score 136 may be determined by a comparison of the degree of match between a first fuzzy set and a second fuzzy set, and/or single values therein with each other or with either set, which is sufficient for purposes of the matching process.

Still referring to FIG. 1, confidence score 136 may be determined as a function of the intersection between two fuzzy sets, wherein each fuzzy set may be representative of a scanned label 120 and a historically scanned labels respectively. Comparing the scanned label 120 and a historically scanned labels may include utilizing a fuzzy set inference system as described herein below, or any scoring methods as described throughout this disclosure. For example, without limitation, processor 104 may use a fuzzy logic model to determine confidence score 136 as a function of fuzzy set comparison techniques as described in this disclosure. In some embodiments, each piece of information associated with a scanned label 120 may be compared to a historically scanned labels, wherein the confidence score 136 may be represented using a linguistic variable on a range of potential numerical values, where values for the linguistic variable may be represented as fuzzy sets on that range; a "good" or "ideal" fuzzy set may correspond to a range of values that can be characterized as ideal, while other fuzzy sets may correspond to ranges that can be characterized as mediocre, bad, or other less-than-ideal ranges and/or values. In embodiments, these variables may be used to compare a scanned label 120 and a historically scanned labels to determine the confidence score 136 specific to the scanned label 120. A fuzzy inferencing system may combine such linguistic variable values according to one or more fuzzy inferencing rules, including any type of fuzzy inferencing system and/or rules as described in this disclosure, to determine a degree of membership in one or more output linguistic variables having values representing ideal overall performance, mediocre or middling overall performance, and/or low or poor overall performance; such mappings may, in turn, be "defuzzified" as described in further detail below to provide an overall output and/or assessment.

Still referring to FIG. 1, the processor may be configured to generate a machine-learning model, such as score machine machine-learning model, using a Naive Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naive Bayes algorithm may be generated by first transforming training data into a frequency table. processor 104 may then calculate a likelihood table by calculating probabilities of different data entries and classification labels. processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a machine-learning model, such as score machine machine-learning model, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm $$l = \sqrt{\sum_{i=0}^{n} a_i^2},$$

where $a_i$ is attribute number experience of the vector. Scaling and/or normalization may function to make vector comparison independent of absolute quantities of attributes, while preserving any dependency on the similarity of attributes; this may, for instance, be advantageous where cases represented in training data are represented by different quantities of samples, which may result in proportionally equivalent vectors with divergent values.

Still referring to FIG. 1, processor 104 may be configured to display confidence score 136 using a display device 144. As used in the current disclosure, a "display device" is a device that is used to display content. A display device 144 may include a user interface. A "user interface," as used herein, is a means by which a user and a computer system interact; for example, through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2:
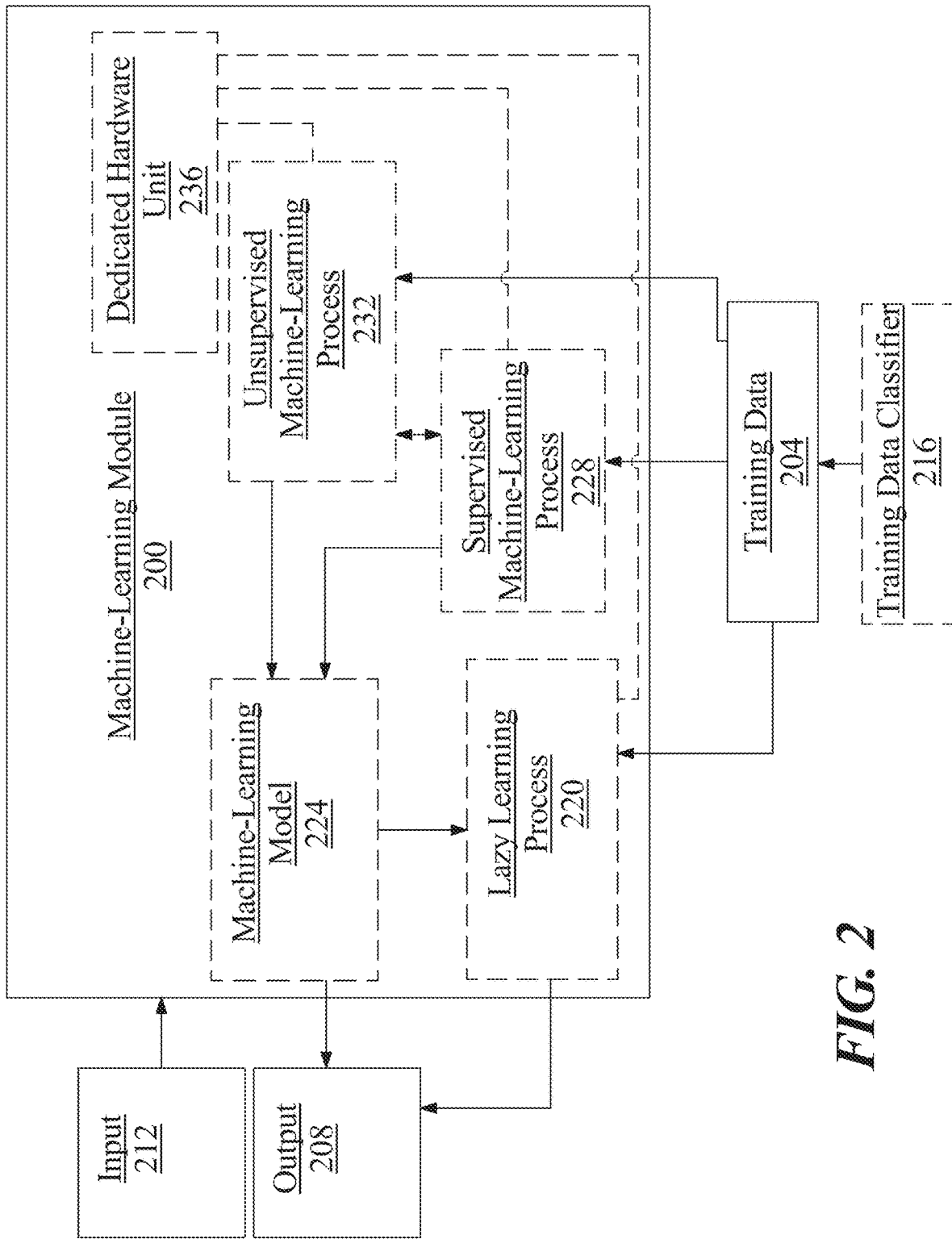
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example of training data 204 is a plurality of scanned labels 120 correlated to examples of confidence scores 136.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include a plurality of scanned labels 120 as described above as inputs, confidence scores 136 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 232. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 232 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 232 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 232 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
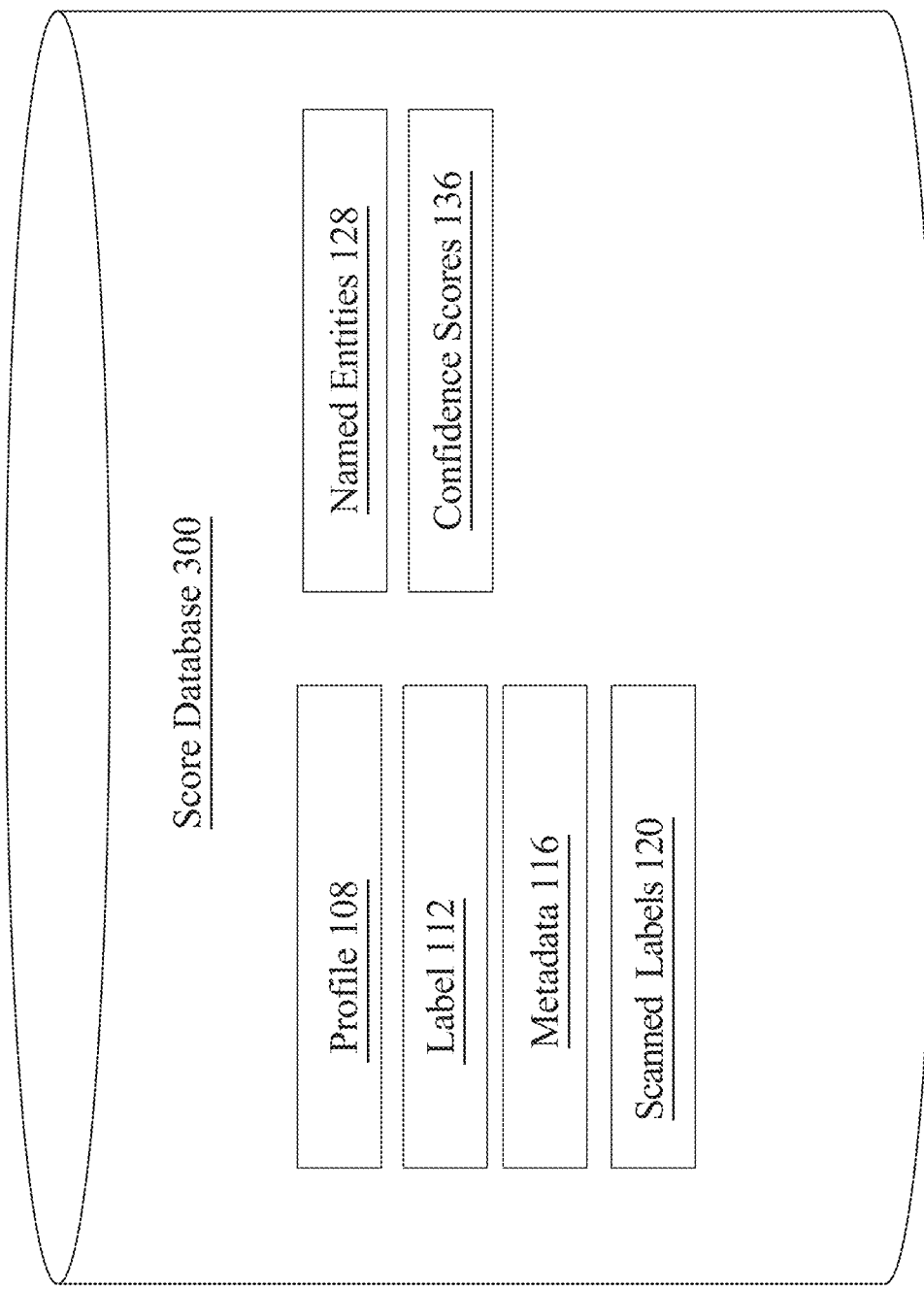
FIG. 3 is a block diagram of an exemplary embodiment of a score database.

Now referring to FIG. 3, an exemplary score database 300 is illustrated by way of block diagram. In an embodiment, any past or present versions of data disclosed herein may be stored within including profile 108, label 112, metadata 116, a plurality of entity categories, scanned labels 120, named entities 128, confidence scores 136, and the like. Processor 104 may be communicatively connected with score database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local servers or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Score database 300 may be implemented, without limitation, as a relational database, a key-value retrieval database such as a NOSQL database, or any other format or structure for use as a database that a person skilled in the art would recognize as suitable upon review of the entirety of this disclosure. Score database 300 may alternatively or additionally be implemented using a distributed data storage protocol and/or data structure, such as a distributed hash table or the like. Score database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In an embodiment, score database 300 may be a generic storage mechanism. A generic storage mechanism may be a storage system or method that is not specific to any particular type or format of data, that is, a storage solution that provides a flexible and adaptable way to store and retrieve data without being tied to a specific data format, schema, or domain.

Figure 4:
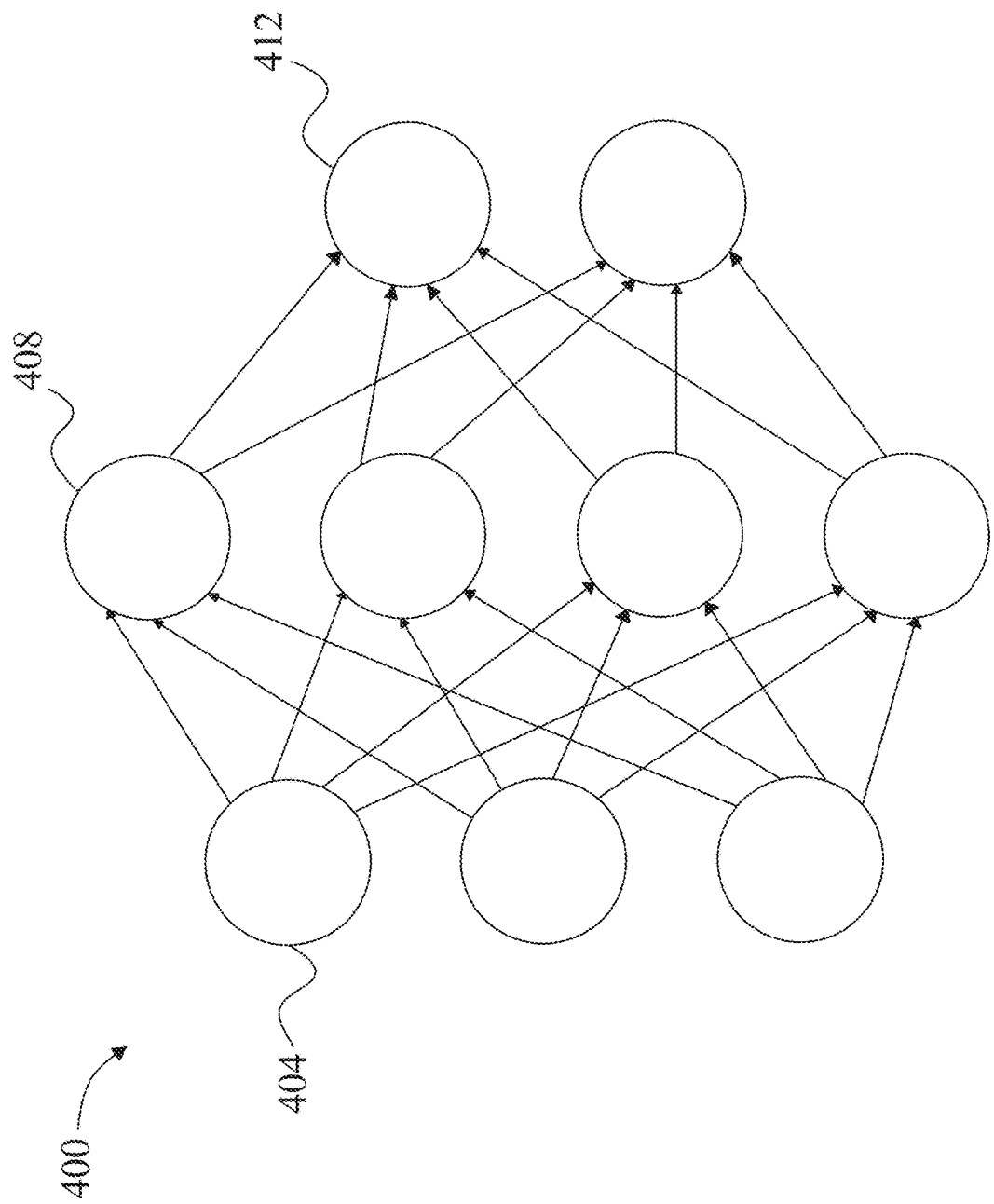
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
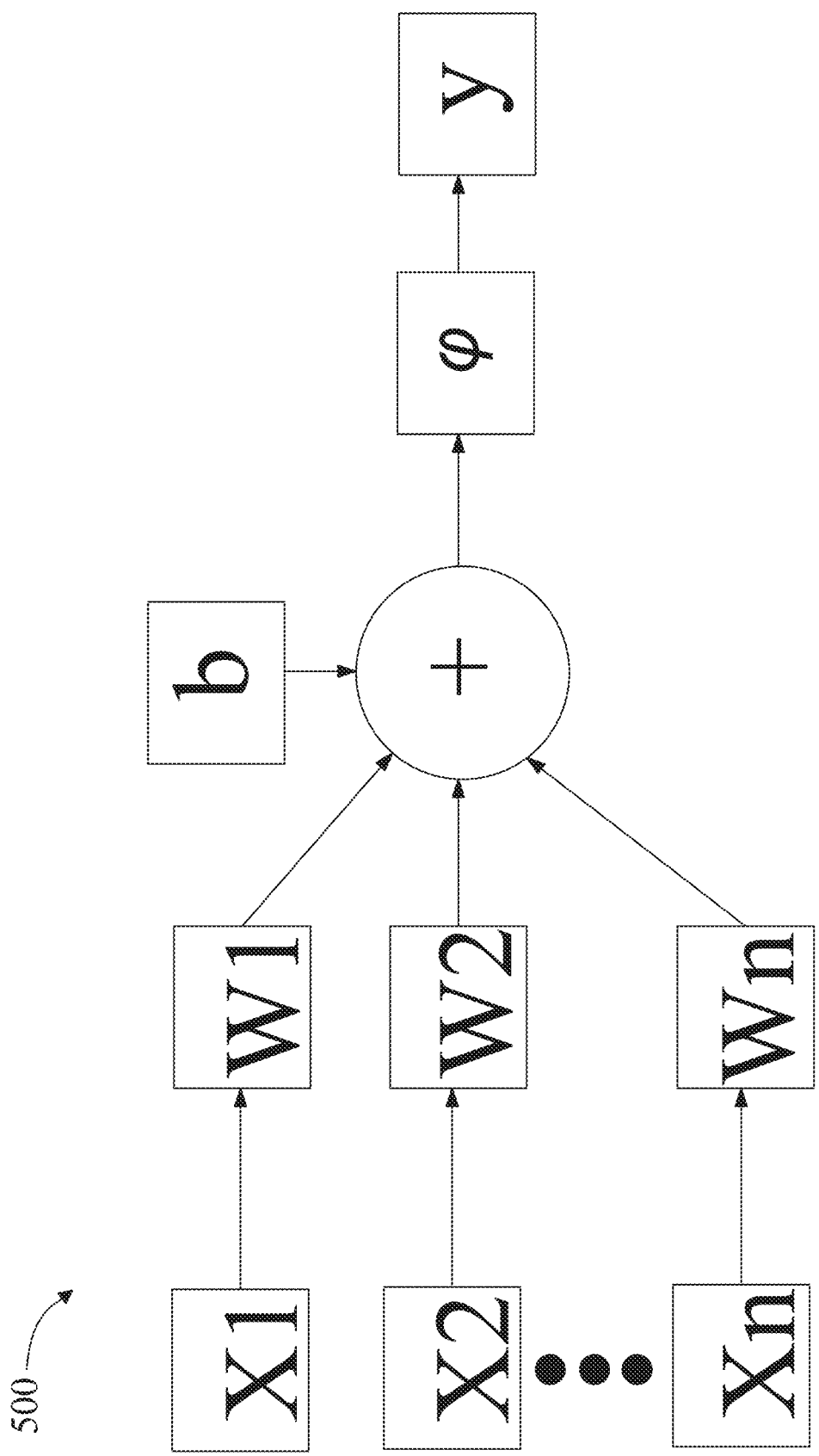
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
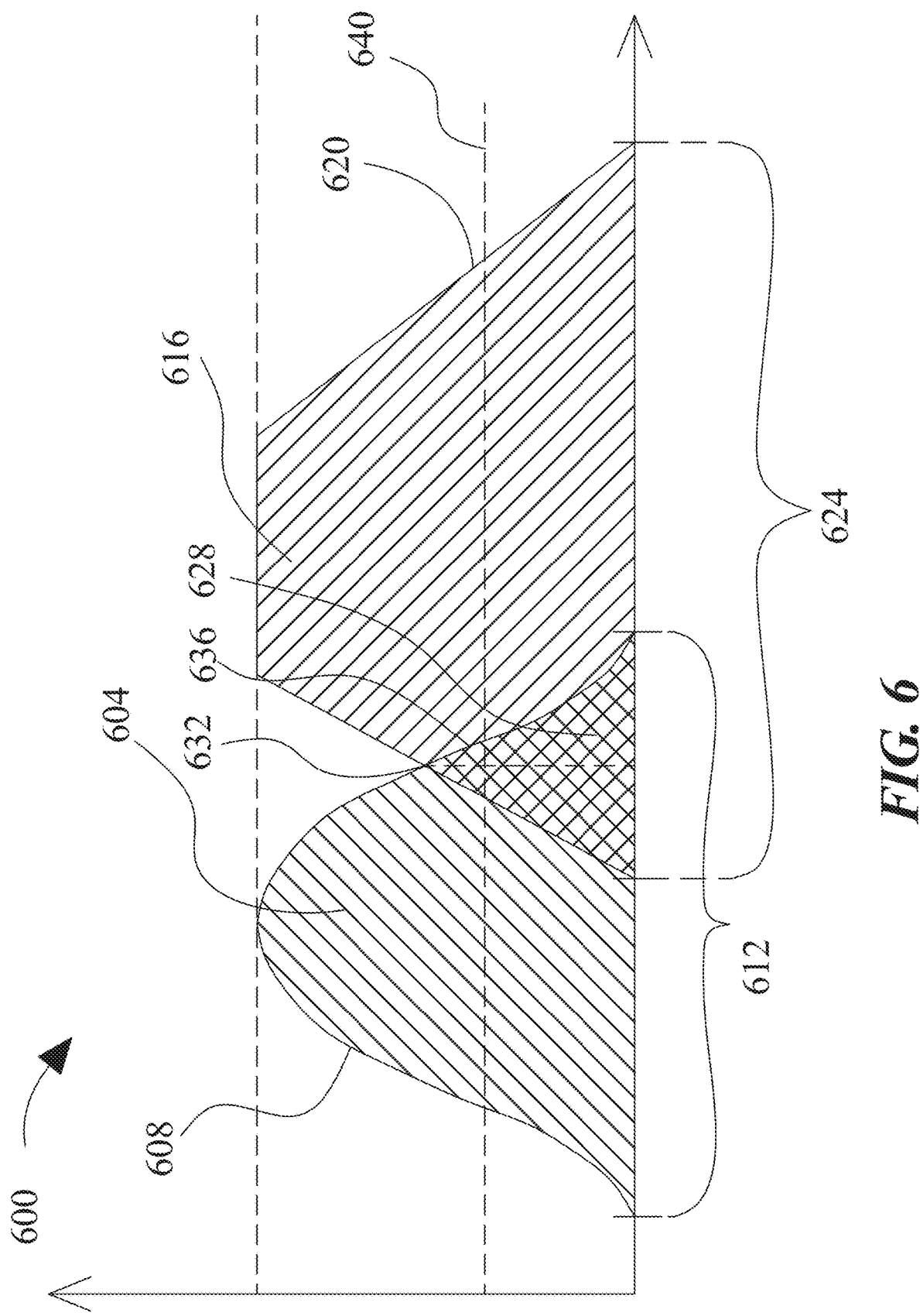
FIG. 6 an illustration exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent a scanned label 120 and historically scanned label from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input a plurality of scanned labels 120 and a plurality of historically scanned labels. For instance, an acceptance variable may represent a first measurable value pertaining to the classification of a plurality of scanned label 120 to an historically scanned label. Continuing the example, an output variable may represent a confidence score 136. In an embodiment, a plurality of scanned label 120 and/or an historically scanned label may be represented by their own fuzzy set. In other embodiments, an evaluation factor may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any a plurality of scanned label 120 and historically scanned label. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, confidence score 136 may indicate a sufficient degree of overlap with fuzzy set representing a plurality of scanned label 120 and an historically scanned label for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both a plurality of scanned label 120 and a historically scanned label have fuzzy sets, confidence score 136 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
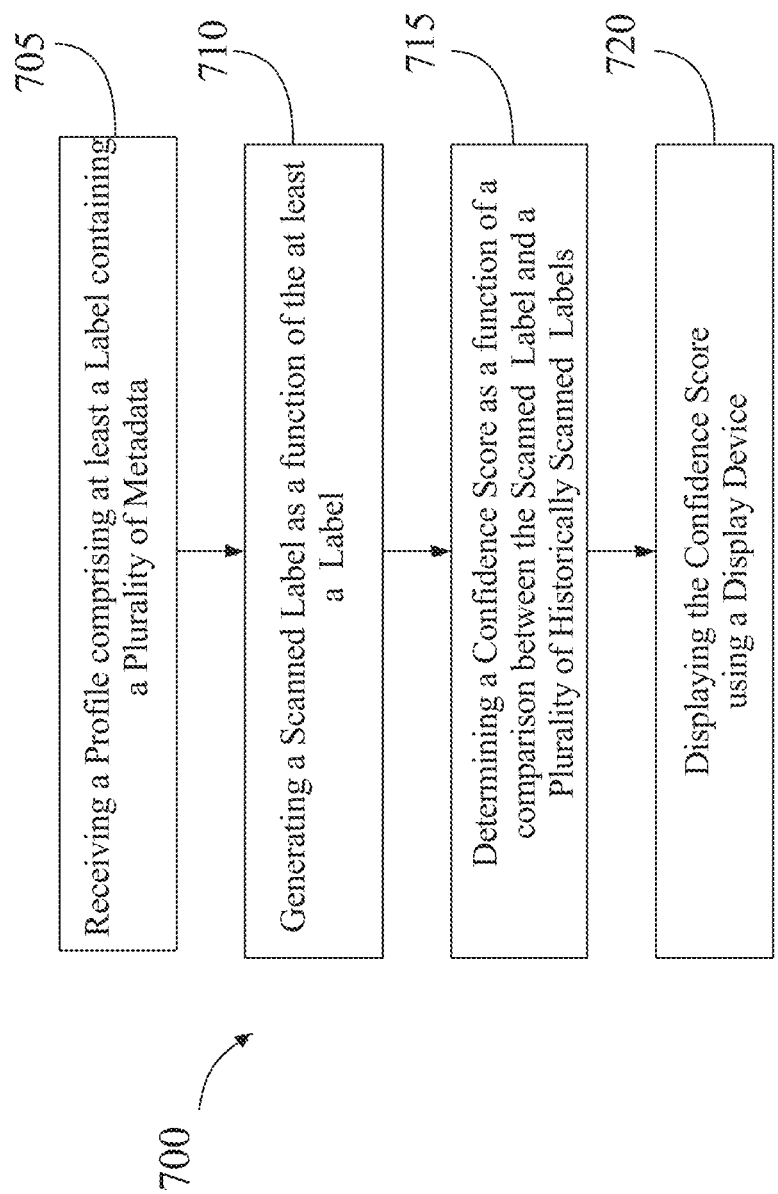
FIG. 7 is a flow diagram of an exemplary method for generating a confidence score associated with a scanned label.

Referring now to FIG. 7, a flow diagram of an exemplary method 700 for generating a confidence score associated with a scanned label is illustrated. At step 705, method 700 includes receiving, using at least a processor, a profile comprising at least a label containing a plurality of metadata. This may be implemented as described and with reference to FIGS. 1-7. The method further includes generating, using the at least a processor, a plurality of named entities as a function the at least a label. The method then includes classifying, using the at least a processor, the plurality of named entities into a plurality of entity categories. In an embodiment, a label include a barcode.

Still referring to FIG. 7, at step 710, method 700 includes generating, using the at least a processor, a scanned label as a function of the at least a label, wherein generating a scanned label comprises scanning the at least a label using a text recognition module. This may be implemented as described and with reference to FIGS. 1-7.

Still referring to FIG. 7, at step 715, method 700 includes determining, using the at least a processor, a confidence score as a function of a comparison between the scanned label and a plurality of historical scanned labels. This may be implemented as described and with reference to FIGS. 1-7. In some embodiments, the confidence score may include a derivation score, expression score, consistency score, and/or temporal consistency score. In other embodiments, generating the confidence score comprises generating the confidence score using a confidence machine learning model. Generating the confidence score using the confidence machine learning model comprises training the confidence machine-learning model using confidence training data, wherein the confidence training data contains a plurality of data entries containing the plurality of scanned label and the plurality of historical scanned labels as inputs correlated to the confidence score as an output and generating the confidence score as a function of a comparison between the scanned label and the plurality of historical scanned labels using a trained confidence machine-learning model.

Still referring to FIG. 7, at step 720, method 700 includes displaying the confidence score using a display device. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
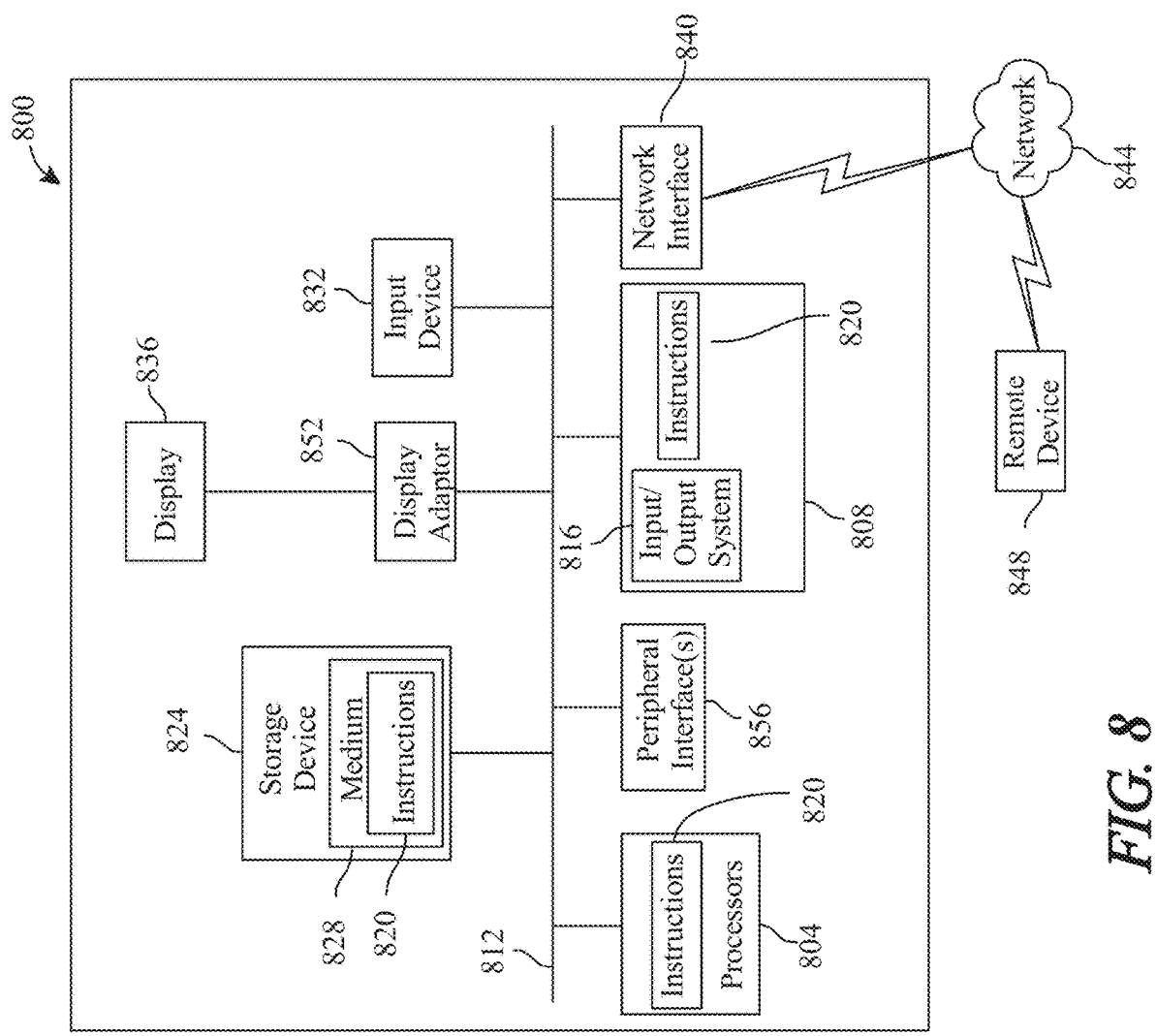
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for generating a confidence score associated with a scanned label, wherein the apparatus comprises:
    at least a processor; and
    a memory connected to the at least a processor, wherein the memory contains instructions configuring the at least a processor to:
        receive a profile, wherein the profile comprises:
            at least a label; and
            a plurality of metadata associated with the at least a label;
        generate a scanned label as a function of the at least a label by scanning the at least a label using a text recognition module;
        determine a confidence score associated with the scanned label as a function of a comparison between the scanned label and a plurality of historical scanned labels, wherein determining the confidence score comprises generating the confidence score using a confidence machine learning model and further comprises:
            receiving a confidence training data set, wherein the confidence training data set comprises outputs correlated to inputs, wherein the inputs comprise the plurality of historical scanned labels and the outputs comprise a plurality of confidence scores;
            training, iteratively, the confidence machine-learning model using the confidence training data set, wherein training the confidence machine-learning model includes retraining the confidence machine-learning model with feedback from previous iterations of the confidence machine-learning model; and determining the confidence score as a function of a comparison between the scanned label and the plurality of historical scanned labels using the trained confidence machine-learning model; and display the confidence score using a display device.

2. The apparatus of claim 1, wherein the memory further instructs the at least a processor to generate a plurality of named entities as a function of the at least a label.

3. The apparatus of claim 2, wherein the memory further instructs the at least a processor to classify the plurality of named entities into a plurality of entity categories.

4. The apparatus of claim 3, wherein classifying the plurality of named entities into the plurality of entity categories comprises classifying the plurality of named entities into the plurality of entity categories as a function of the spatial positioning of the plurality of named entities on the scanned label.

5. The apparatus of claim 1, wherein the confidence score comprises a derivation score.

6. The apparatus of claim 1, wherein the confidence score comprises an expression score.

7. The apparatus of claim 1, wherein the confidence score comprises a consistency score.

8. The apparatus of claim 1, wherein the confidence score comprises a temporal consistency score.

9. The apparatus of claim 1, wherein the at least a label comprises an identification code.

10. A method for generating a confidence score associated with a scanned label, wherein the method comprises:
   receiving, using at least a processor, a profile, wherein the profile comprises:
      at least a label; and
      a plurality of metadata associated with the at least a label;
   generating, using the at least a processor, a scanned label as a function of the at least a label by scanning the at least a label using a text recognition module;
   determining, using the at least a processor, a confidence score associated with the scanned label as a function of a comparison between the scanned label and a plurality of historical scanned labels, wherein determining the confidence score comprises generating the confidence score using a confidence machine learning model and further comprises:
   receiving a confidence training data set, wherein the confidence training data set comprises outputs correlated to inputs, wherein the inputs comprise the plurality of historical scanned labels and the outputs comprise a plurality of confidence scores;
   training, iteratively, the confidence machine-learning model using the confidence training data set, wherein training the confidence machine-learning model includes retraining the confidence machine-learning model with feedback from previous iterations of the confidence machine-learning model; and
   determining the confidence score as a function of a comparison between the scanned label and the plurality of historical scanned labels using the trained confidence machine-learning model; and
   displaying the confidence score using a display device.

11. The method of claim 10, wherein the method further comprises generating, using the at least a processor, a plurality of named entities as a function of the at least a label.

12. The method of claim 11, wherein the method further comprises classifying, using the at least a processor, the plurality of named entities into a plurality of entity categories.

13. The method of claim 12, wherein the method further comprises classifying, using the at least a processor, the plurality of named entities into a plurality of entity categories as a function of the spatial positioning of the plurality of named entities on the scanned label.

14. The method of claim 10, wherein the confidence score comprises a derivation score.

15. The method of claim 10, wherein the confidence score comprises an expression score.

16. The method of claim 10, wherein the confidence score comprises a consistency score.

17. The method of claim 10, wherein the confidence score comprises a temporal consistency score.

18. The method of claim 10, wherein the at least a label comprises an identification code.

* * * * *